United States Patent
Márquez López et al.

(10) Patent No.: US 9,694,856 B1
(45) Date of Patent: Jul. 4, 2017

(54) SYSTEM FOR ATTACHING VEHICLE FENDERS TO A COMMON FRONT END STRUCTURE

(71) Applicant: FORD GLOBAL TECHNOLOGIES, LLC, Dearborn, MI (US)

(72) Inventors: Alfonso Márquez López, Dearborn, MI (US); Ramon Credi, Atizapan de Zaragoza (MX); Michael Shawn Watterworth, Brighton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 4 days.

(21) Appl. No.: 14/974,452

(22) Filed: Dec. 18, 2015

(51) Int. Cl.
 *B62D 23/00* (2006.01)
 *B62D 25/16* (2006.01)
 *B60R 21/34* (2011.01)

(52) U.S. Cl.
 CPC ............ *B62D 25/163* (2013.01); *B60R 21/34* (2013.01); *B60R 2021/343* (2013.01)

(58) Field of Classification Search
 CPC ...... B62D 25/168; B62D 25/18; B62D 25/16; C08L 2666/02; E05Y 2900/531; A01B 63/1117; A01B 71/06; B60K 25/00; Y10T 477/675
 USPC ....... 296/35.1, 191, 198; 280/154, 770, 847, 280/848, 849, 851; 362/506
 See application file for complete search history.

(56) References Cited

U.S. PATENT DOCUMENTS

| | | | | |
|---|---|---|---|---|
| 4,030,773 A | * | 6/1977 | Meixner | B62D 25/16 280/848 |
| 4,115,974 A | * | 9/1978 | Purcell | B60C 23/18 296/1.08 |
| 4,186,476 A | * | 2/1980 | Mair | B62D 25/105 180/69.21 |
| 4,266,792 A | * | 5/1981 | Sanders | B60R 3/002 280/163 |
| 4,268,052 A | * | 5/1981 | Sullivan | B62D 25/18 280/848 |
| 4,293,140 A | * | 10/1981 | Bell | B62D 25/18 280/851 |

(Continued)

FOREIGN PATENT DOCUMENTS

JP    5521537 B2    6/2014

OTHER PUBLICATIONS

English machine translation of JP5521537B2.

*Primary Examiner* — Kiran B Patel
(74) *Attorney, Agent, or Firm* — Jason C. Rogers; King & Schickli, PLLC

(57) ABSTRACT

A vehicle assembly system and related method are provided. The vehicle assembly system includes a first fender for a first vehicle model having a first shape, a second fender for a second vehicle model having a second, different shape, a front end structure common to the first vehicle model and the second vehicle model, and a support common to the first vehicle model and the second vehicle model. The support has a first member attached to a downstanding flange of the first fender or a downstanding flange of the second fender and a second member extending from a lower portion of the first member is attached to the front end structure. The system and method provide a simple and inexpensive way to attach fenders having different shapes to a common front end of a vehicle.

11 Claims, 4 Drawing Sheets

(56) References Cited

U.S. PATENT DOCUMENTS

| | | | | |
|---|---|---|---|---|
| 4,447,067 A * | 5/1984 | Yamashita | B62D 25/161 | 280/848 |
| 4,607,878 A * | 8/1986 | Itoh | B60R 13/04 | 280/850 |
| 4,912,826 A * | 4/1990 | Dixon | B29C 66/74 | 264/263 |
| 5,066,057 A * | 11/1991 | Furuta | B60R 19/18 | 293/121 |
| 5,226,695 A * | 7/1993 | Flint | B60R 19/24 | 293/121 |
| 5,271,658 A * | 12/1993 | Haldenwanger | B62D 25/16 | 296/191 |
| 5,297,845 A * | 3/1994 | Smartt | B62D 25/163 | 280/154 |
| 5,358,304 A * | 10/1994 | Kanemitsu | B62D 25/084 | 180/68.4 |
| 5,466,035 A * | 11/1995 | Klages | B62D 29/008 | 296/187.09 |
| 5,613,710 A * | 3/1997 | Waner | B62D 25/161 | 280/848 |
| 5,806,620 A * | 9/1998 | DeRees | B62D 29/043 | 180/69.2 |
| 5,829,786 A * | 11/1998 | Dahl | B62D 25/18 | 280/848 |
| 5,957,512 A * | 9/1999 | Inada | B60R 19/24 | 293/102 |
| 5,988,714 A * | 11/1999 | Akazawa | B60R 19/18 | 293/120 |
| 6,135,517 A * | 10/2000 | Cordebar | B60R 19/24 | 293/128 |
| 6,698,820 B2 * | 3/2004 | Nakata | B60R 21/34 | 293/120 |
| 6,929,313 B2 * | 8/2005 | Fries | B62D 25/161 | 296/193.05 |
| 7,207,617 B2 | 4/2007 | Pelini | | |
| 7,258,383 B2 * | 8/2007 | Pfister | B60R 19/24 | 296/29 |
| 7,537,243 B1 * | 5/2009 | Perry | B62D 25/18 | 280/152.3 |
| 7,878,579 B2 | 2/2011 | Yoshino et al. | | |
| 8,042,852 B2 * | 10/2011 | Onuma | B05B 13/0292 | 296/1.08 |
| 8,567,853 B2 * | 10/2013 | Huber | B60R 19/24 | 293/120 |
| 8,905,465 B2 | 12/2014 | Landholm et al. | | |
| 8,960,725 B2 * | 2/2015 | Rund | B62D 25/161 | 280/154 |
| 9,061,707 B2 | 6/2015 | Courtright et al. | | |
| 9,102,359 B2 | 8/2015 | Stojkovic et al. | | |
| 9,371,094 B1 * | 6/2016 | Ferauche | B60R 19/18 | |
| 2004/0007901 A1 * | 1/2004 | Weik | B62D 25/082 | 296/198 |
| 2005/0242625 A1 * | 11/2005 | Hafner | B62D 25/163 | 296/193.05 |
| 2007/0182212 A1 * | 8/2007 | Roux | B60R 21/34 | 296/198 |
| 2013/0334834 A1 * | 12/2013 | Lee, III | B62D 25/163 | 296/35.1 |

* cited by examiner

SYSTEM FOR ATTACHING VEHICLE FENDERS TO A COMMON FRONT END STRUCTURE

TECHNICAL FIELD

This document relates generally to vehicle fenders, and more specifically to a system for attaching different fenders to a common front end structure.

BACKGROUND

Fenders are a common component of vehicles and provide protection against mud, rocks, and other road spray and debris from being thrown into the air by the rotating tires. Front and rear fenders are typically stamped and include an integrally formed flange running along the fender for attachment to a vehicle's front end structure (e.g., a fender support rail). A fender 10 may accommodate direct attachment between a fender flange 12 and a vehicle front end structure 14 as shown in FIG. 1, or a fender 10' may require local brackets (e.g., bracket 16) to bridge a gap ($G_1$) between a fender flange 12' and the front end structure 14 as shown in FIG. 2. The manner in which the fender is attached depends on the shape of the fender which shape varies from one vehicle model to another.

Given the difference in fender shapes from one vehicle model to another, the local brackets are typically each uniquely designed. This necessarily results in increased overall cost attributable to bracket design, fabrication and installation costs. Even more, the utilization of local brackets (e.g., bracket 18) to secure the fender 10', as shown in FIG. 3, creates a visually undesirable gap ($G_2$) between the front end structure 14 and the fender 10' within an engine compartment.

Yet another drawback to utilization of local brackets is the elevation of the point where the local bracket attaches to the fender. As shown in FIGS. 2 and 3, the attachment points are a distance ($D_1$ and $D_2$) below a hood 20 of the vehicle which positioning creates a hard point closer to an exterior surface of the hood than if the fender flange 12' were attached directly to the front end structure 14 as shown in FIG. 1. In other words, distance D is greater than either distance $D_1$ or $D_2$ ($D > D_1 > D_2$).

Such hard points have been limited in recent years due to a focus by manufacturers on vehicle designs which are more pedestrian friendly in the event of pedestrian vehicle collisions. In fact, hood and engine compartment designs have received many subtle changes to ensure easy collapse when impacted by a pedestrian such that a vast majority of vehicles sold today have design elements intended to soften the impact on pedestrians in such collisions. One such design element is an increase in deformable space between the hood and the engine. The creation of hard points through utilization of local brackets is obviously contrary to the recent improvements and reduces the protection for pedestrians in the event of vehicle pedestrian collisions.

Accordingly, a need exists for a simple and inexpensive way to attach fenders having different shapes to a common front end of a vehicle. Ideally, the solution would accommodate the different fender shapes of differing vehicle models allowing for a higher level of craftsmanship for the fenders. Even more, the solution would eliminate the need for local bracketing and unsightly gaps often created by their utilization. Last, the solution would ensure that the point of attachment would be adjacent the common front end providing a safer vehicle in the event of vehicle pedestrian collisions.

SUMMARY OF THE INVENTION

In accordance with the purposes and benefits described herein, a vehicle assembly system includes a first fender for a first vehicle model, said first fender having a first shape including a downstanding flange, a second fender for a second vehicle model, said second fender having a second, different shape including a downstanding flange, a front end structure common to the first vehicle model and the second vehicle model, and a support common to the first vehicle model and the second vehicle model, said support having a first member attached to said downstanding flange of said first fender or said downstanding flange of said second fender and a second member extending from a lower portion of said first member and attached to said front end structure.

In another possible embodiment, a thickness of said support is greater than a thickness of said downstanding flange of the first vehicle model or said downstanding flange of the second vehicle model.

In still another possible embodiment, the first member and said second member of said support are integrally formed.

In yet another possible embodiment, the front end structure common to the first vehicle model and the second vehicle model is a fender support rail. In another, the fender support rail is a hydroform tube.

In one other possible embodiment, the support common to the first vehicle model and the second vehicle model extends substantially the length of said first fender or said second fender.

In still yet another possible embodiment, the support common to the first vehicle model and the second vehicle model includes a fore support and an aft support, each of said fore and aft supports having a first member attached to said downstanding flange of said first fender or said downstanding flange of said second fender and a second member extending from a lower portion of said first member and attached to said front end structure.

In still another possible embodiment, the support attaches directly to said front end structure thereby eliminating unsightly gaps between said front end structure and said first or second fenders, and ensuring the attachment points are not raised above said front end structure. In another, the support attaches to said front end structure in at least three locations along said front end structure.

In a second possible embodiment, a vehicle assembly system includes a first shaped fender having a downstanding flange for a first vehicle model, a second shaped fender having a downstanding flange for a second vehicle model, a front end structure common to the first vehicle model and the second vehicle model, and a support common to the first vehicle model and the second vehicle model, said support having a first surface substantially conforming to a portion of and attached to said downstanding flange of said first shaped fender or said downstanding flange of said second shaped fender, and a second surface substantially conforming to a portion of said front end structure.

In another possible embodiment, the front end structure common to the first vehicle model and the second vehicle model is a fender support rail. In yet another, the fender support rail is a hydroform tube.

In still another possible embodiment, the support common to the first vehicle model and the second vehicle model extends substantially the length of said first shaped fender or said second shaped fender.

In yet another possible embodiment, the support common to the first vehicle model and the second vehicle model includes at least two supports, each of said at least two supports having a first surface substantially conforming to a portion of and attached to said downstanding flange of said first shaped fender or said downstanding flange of said second shaped fender, and a second surface substantially conforming to a portion of said front end structure.

A vehicle incorporating any of the vehicle assembly systems described above.

In a third possible embodiment, a method of connecting a vehicle front end common to first and second models of vehicles to either of two stamped fenders, wherein a first stamped fender has a first shape, including a downstanding flange, designed for the first model of vehicle and a second stamped fender has a different, second, shape, including a downstanding flange, designed for the second model of vehicle, includes the steps of: stamping one of said first or second stamped fenders into either said first shape or said second shape; attaching a first member of a support to the downstanding flange of the stamped fender; and attaching a second member of said support to said common front end.

In another possible embodiment, the first member and said second member of said support are integrally formed.

In yet another possible embodiment, the front end structure common to the first vehicle model and the second vehicle model is a fender support rail. In another, the fender support rail is a hydroform tube.

In still yet another possible embodiment, the support common to the first vehicle model and the second vehicle model extends substantially the length of said first fender or said second fender.

In the following description, there are shown and described several embodiments of a vehicle assembly system and related methods of connecting a vehicle front end structure common to first and second models of vehicles to differing stamped fenders. As it should be realized, the systems and methods are capable of other, different embodiments and their several details are capable of modification in various, obvious aspects all without departing from the methods and assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the vehicle assembly system and methods of connecting a front end structure common to multiple vehicle models to stamped fenders having different shapes and together with the description serve to explain certain principles thereof. In the drawing figures.

Reference will now be made in detail to the present preferred embodiments of the vehicle assembly system and methods of connecting a front end structure common to multiple vehicle models to stamped fenders having different shapes, examples of which are illustrated in the accompanying drawing figures, wherein like numerals are used to represent like elements.

DETAILED DESCRIPTION

Figure 1:
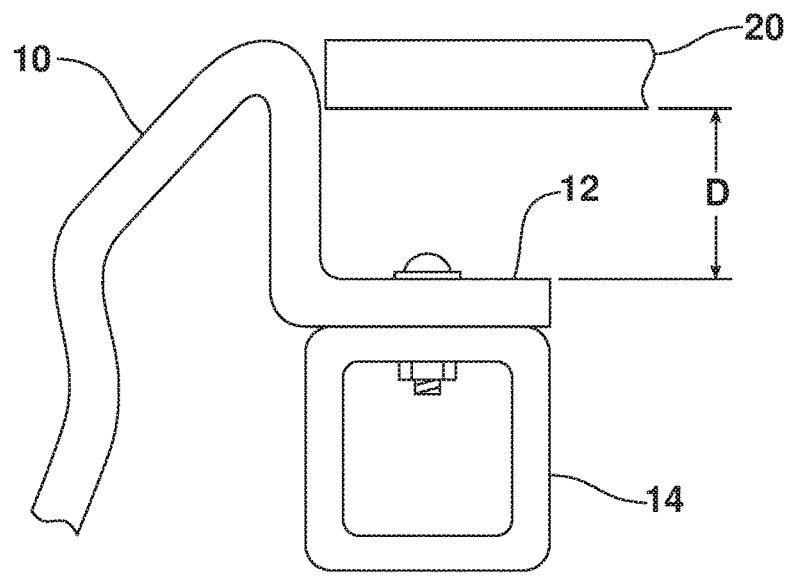
FIG. 1 is a cross sectional plan view of a prior art fender flange attached directly to a vehicle front end structure.
Figure 2:
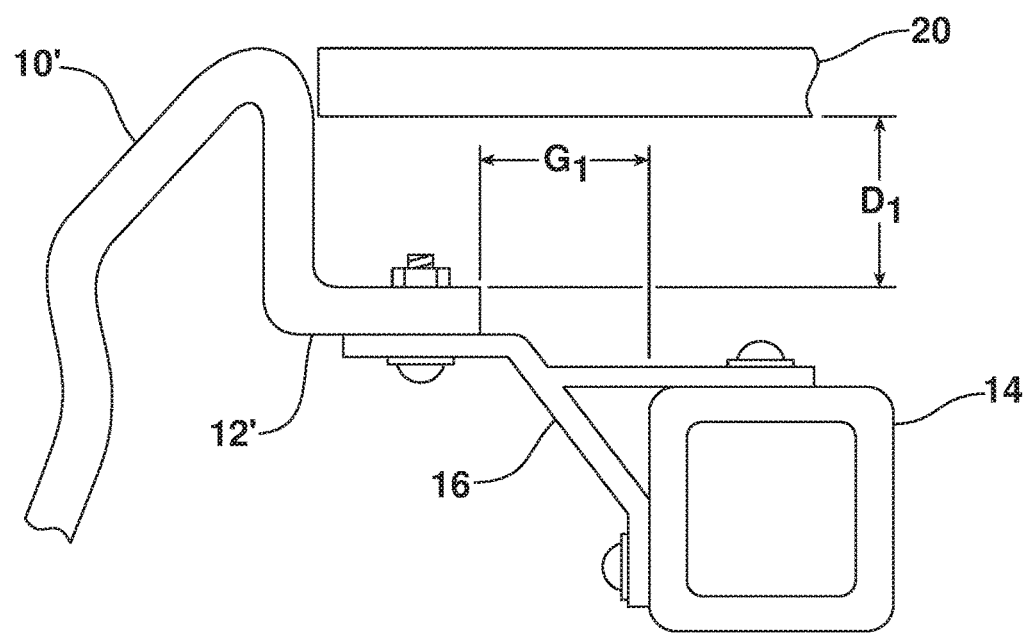
FIG. 2 is a cross sectional plan view of a prior art fender flange attached to the vehicle front end structure using a first local bracket.
Figure 3:
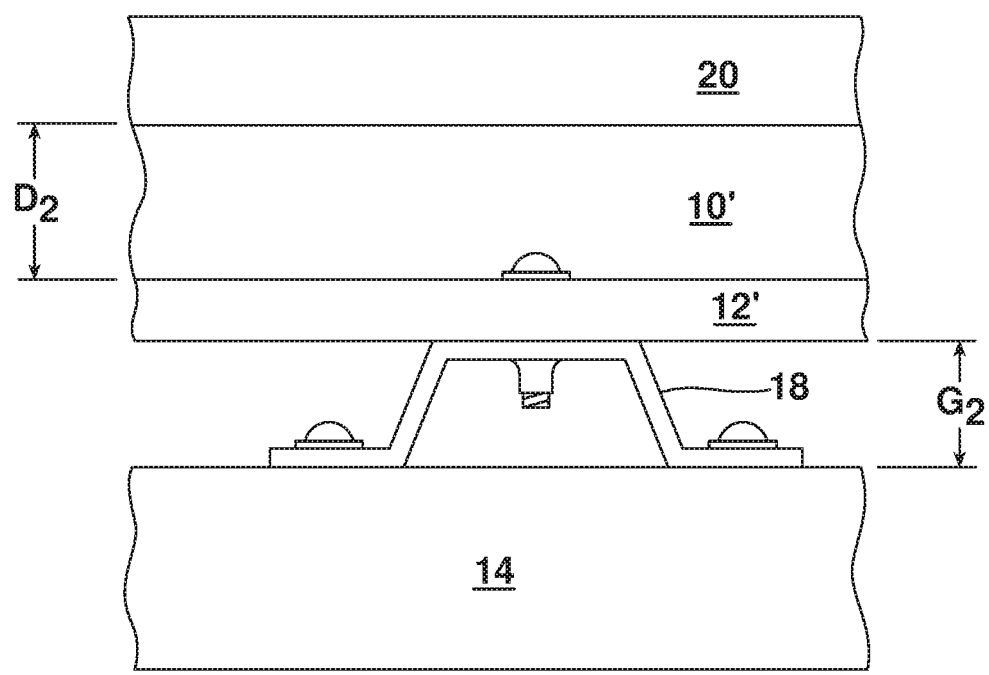
FIG. 3 is a partial side plan view of the prior art fender flange attached to the vehicle front end structure using a second local bracket.
Figure 4:
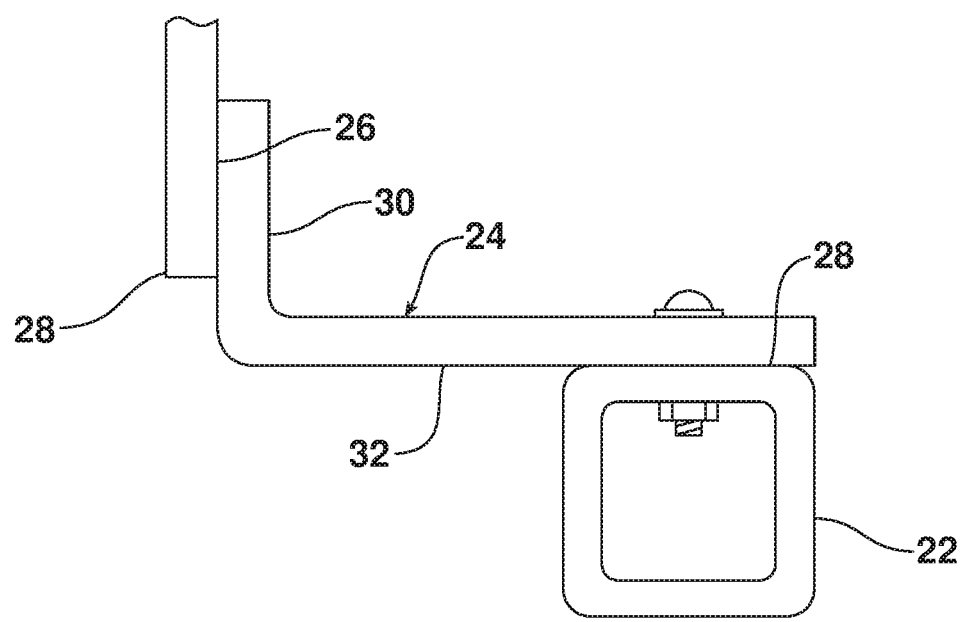
FIG. 4 is a cross sectional plan view of a support attached directly to a vehicle front end structure and a downstanding flange of a fender.

Reference is now made to FIG. 4 that illustrates a front end structure 22 which is common to a first vehicle model and a second vehicle model. In the described embodiment, the front end structure 22 is a fender rail and, more specifically, a hydroform tube. In alternate embodiments, the front end structure may include a frame or other structure of the vehicle.

For purposes of simple illustration, a support 24 is shown in a basic L-shaped configuration including first and second integrally formed members 30, 32. The first and second members 30, 32 could be welded together in alternate embodiments, or otherwise attached one to the other. The support 24 includes a first surface 26 and a second surface 28. The first surface 26 is attached to a downstanding flange 28 of a fender of the first vehicle model or the second vehicle model. As shown, the fender terminates in the downstanding flange 28 and a thickness of the support 24 is greater than a thickness of the downstanding flange 28. The second surface 28 is similarly attached to the front end structure 22. It should be noted that the shape of the support may vary from the basic L-shaped configuration to accommodate different attachment points with the fender or, more specifically, with the downstanding flange of the fender.

Figure 5:
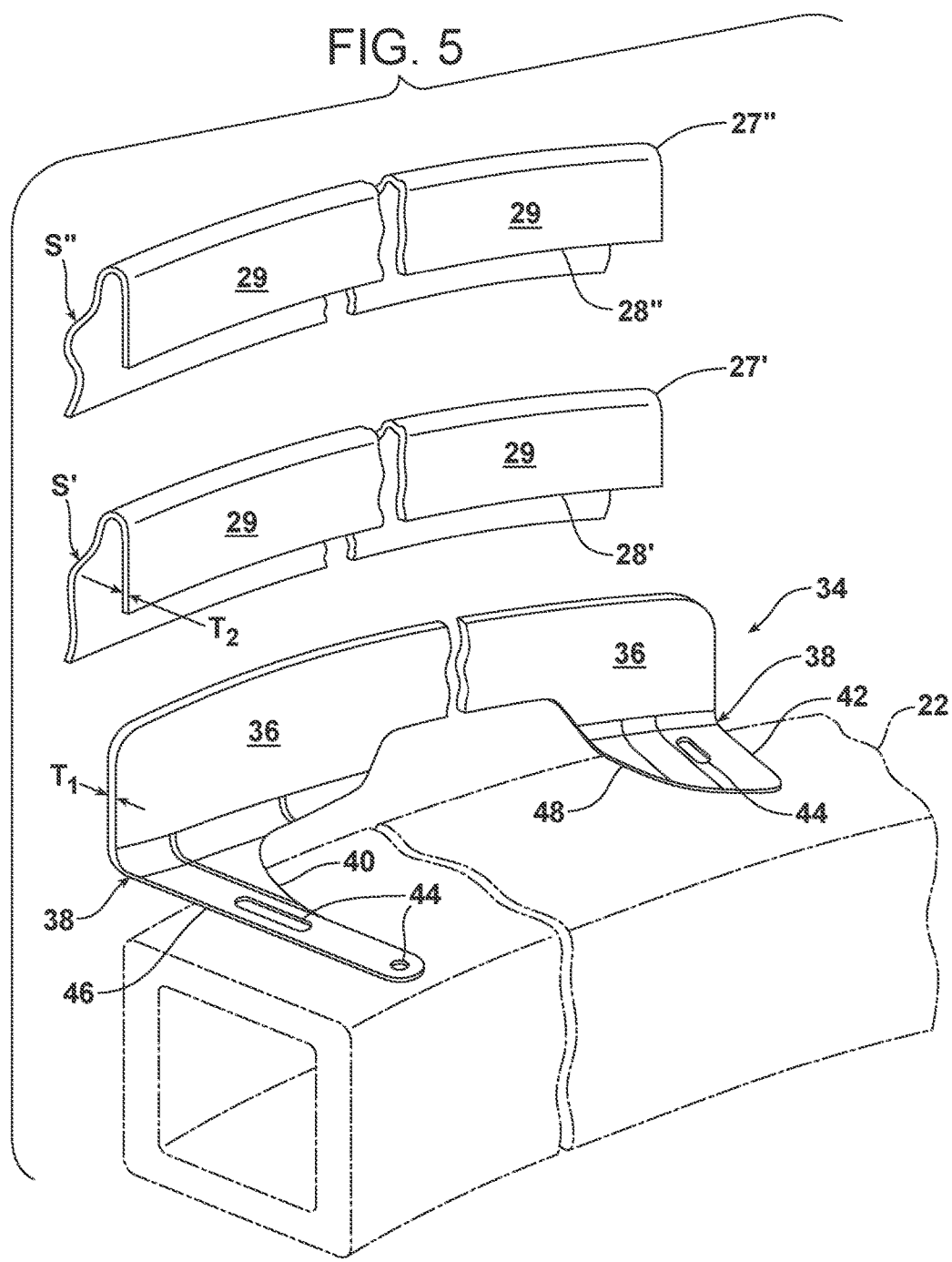
FIG. 5 is a perspective view of a different support attached directly to a vehicle front end structure and a downstanding flange of a fender.

In the embodiment shown in FIG. 5, a support 34 maintains a generally L-shaped configuration but the shape is much more complex than the basic L-shape configuration shown in FIG. 4. Given the general proximity of vehicle fenders to the front end structure and the desire to have the support/front end structure attachment points as close to the front end structure as possible, some type of L-shaped configuration will most often meet the design goals although other shapes are capable of doing the same. For example, an alternate support could extend below an upper surface of the front end structure, and make contact with both an outer surface and the upper surface of the front end structure. Even more, the attachment point between the support and the downstanding flange could be located below the upper surface of the front end structure.

In the described embodiment, the support 34 includes a first member 36 and a second member 38 extending from a lower portion of the first member. As shown, the second member 38 in the described embodiment includes two portions 40 and 42 that resemble feet. Each of the portions 40 and 42 include one or more apertures 44 for use in attaching the support 34 to the front end structure 22. As shown, the apertures may be round holes, slots, or other shapes intended to accommodate assembly of the support 34 and/or other parts of the vehicle.

As shown in dashed line in FIG. 5, the front end structure 22 can take almost any shape, including the curved shape shown, and the support 34 and portions 40 and 42 are likewise shaped to accommodate attachment to the front end structure. The use of hydroforming allows the front end structure to take on complex shapes, with or without concavities, as dictated by vehicle design demands. Necessarily, therefore at least lower surfaces 46 and 48 of the corresponding support portions 40 and 42 are shaped to substantially conform with localized portions of the front end structure 22, i.e., the area where the support 34 attaches to the front end structure. This flexibility ensures the attachment points are not raised above the front end structure 22 thereby preserving a desired amount of deformable space between the hood and the engine and providing protection for pedestrians in the event of vehicle pedestrian collisions.

In addition to flexibility in shape, the support 34 (shown divided in FIG. 5) can also vary in length. In the described embodiment, the support 34 extends substantially the length of the fender. As shown in FIG. 5, fenders 27' and 27" terminate in downstanding flanges 28' and 28" respectively. As such, the support may include more than two support portions in order to provide sufficient support along the length of the fender. In other words, the support could include any number of support portions, or feet, which attach to the front end structure 22 in the same manner the two support portions 40 and 42 do in the embodiment shown in FIG. 5. Alternatively, second member 38 could extend the length of the fender.

In another alternate embodiment, the vehicle assembly system may utilize more than one support in place of a single lengthy support. For example, a fore support could be attached closer to a front of the vehicle and an aft support could be attached a distance from the front of the vehicle. In such alternate embodiments, each of the two or more supports would include a first surface, or member, substantially conforming to a corresponding portion of a downstanding flange 28 for attachment thereto, and a second surface substantially conforming to a portion of the front end structure 22. In other words, each of the plurality of supports would be similar to the support 34 described above but different in shape to accommodate the shape of the front end structure 22 and the downstanding flange 28 where the particular support is attached.

As indicated above, the front end structure 22 is common to at least first and second vehicle models. Similarly, as shown in FIG. 5, the downstanding flange 28', 28" is common to at least a first fender 27' for the first vehicle model and a second fender 27" for the second vehicle model. In other words, regardless of the shape (S' or S") of the fender 27', 27" from one vehicle model to another, the surface 29 of the downstanding flange 28'. 28" which mates with the first member 36 of the support 34 is the same. This may require localized variations in thickness or other dimensions of the downstanding flange 28', 28" but the flange surface 29 must mate the support 34. In the described embodiment, the support 34 is welded to the downstanding flange 28. However, other means of attaching the two (e.g., riveting) are known in the art and may be utilized.

In accordance with the method of connecting a vehicle front end common to a first vehicle model and a second vehicle model to either of two stamped fenders, a first fender 27' having a first shape S', terminates in a downstanding flange 28', designed for the first type of vehicle or a second fender 27" having a different, second shape S", terminates in a downstanding flange 28", designed for the second type of vehicle, is stamped. A first member 36 of a support 34 is then attached to the downstanding flange 28', 28" of the stamped fender 27', 27" and a second member of the support is attached to the common front end 22.

As described above and shown in FIG. 5, the first and second members 36 and 38 are integrally formed. Even more, the front end structure 22 common to the first and second vehicle models is a fender support rail. More specifically, the fender support rail is a hydroform tube. As also described above, the support 34 extends substantially the length of the first fender or the second fender.

In summary, numerous benefits result from the vehicle assembly system and related method of connecting a front end structure common to multiple vehicle models to differing stamped fenders connecting a vehicle, are illustrated in this document. The system and method provide a simple and inexpensive way to attach fenders having different shapes to a common front end of a vehicle. This allows for a higher level of craftsmanship for the individual fenders. Even more, the system eliminates the need for local bracketing and unsightly gaps often created by the utilization of such brackets. Last, the system ensures that the point of attachment with the common front end is adjacent the front end providing a safer vehicle in the event of vehicle pedestrian collisions.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A multi vehicle model system comprising:
   a fender terminating in a downstanding flange, said fender having a first shape in a first vehicle model and a second shape in a second vehicle model, and said downstanding flange having a first surface generally facing said fender and a second surface common to said first vehicle model and said second vehicle model generally facing away from said fender;
   a front end structure common to said first vehicle model and said second vehicle model; and
   a support having a first member attached to said second surface of said downstanding flange and a second member extending from said first member and attached to said front end structure.

2. The multi-vehicle model system of claim 1, wherein a thickness of said support is greater than a thickness of said downstanding flange.

3. The multi-vehicle model system of claim 1, wherein said first member and said second member of said support are integrally formed.

4. The multi-vehicle model system of claim 1, wherein said front end structure is a fender support rail.

5. The multi-vehicle model system of claim 4, wherein said fender support rail is a hydroform tube.

6. The multi-vehicle model system of claim 1, wherein said downstanding flange and said support extend substantially a length of said fender.

7. The multi-vehicle model system of claim 1, wherein said second member includes at least two portions having at least one aperture formed therein for attachment to said front end structure.

8. The multi-vehicle model system of claim 7, wherein said at least two portions are shaped to substantially conform to corresponding at least two localized portions of said front end structure.

9. The multi-vehicle model system of claim 1, wherein said support is attached to said front end structure such that said first member is in contact with said front end structure.

10. The multi-vehicle model system of claim 1, wherein said support attaches to said front end structure in at least three locations along said front end structure.

11. The vehicle assembly of claim 1, wherein said support includes a first surface substantially conforming to a portion of and attached to said downstanding flange, and a second surface substantially conforming to a portion of and attached to said front end structure.

* * * * *